(12) United States Patent
Xu et al.

(10) Patent No.: US 12,015,694 B2
(45) Date of Patent: Jun. 18, 2024

(54) OPTICAL CHANNEL INTENSITY STREAMING ENCRYPTION

(71) Applicant: California Institute of Technology, Pasadena, CA (US)

(72) Inventors: Jian Xu, Pasadena, CA (US); Changhuei Yang, South Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 339 days.

(21) Appl. No.: 17/487,924

(22) Filed: Sep. 28, 2021

(65) Prior Publication Data

US 2022/0103348 A1 Mar. 31, 2022

Related U.S. Application Data

(60) Provisional application No. 63/084,336, filed on Sep. 28, 2020.

(51) Int. Cl.
| | |
|---|---|
| *H04L 9/06* | (2006.01) |
| *G02B 27/48* | (2006.01) |
| *H04B 10/2537* | (2013.01) |
| *H04B 10/54* | (2013.01) |
| *H04B 10/66* | (2013.01) |

(52) U.S. Cl.
CPC ............ *H04L 9/0656* (2013.01); *G02B 27/48* (2013.01); *H04B 10/2537* (2013.01); *H04B 10/54* (2013.01); *H04B 10/66* (2013.01)

(58) Field of Classification Search
CPC ... H04L 9/0656; G02B 27/48; H04B 10/2537; H04B 10/54; H04B 10/66
See application file for complete search history.

(56) References Cited

U.S. PATENT DOCUMENTS

| | | | |
|---|---|---|---|
| 2013/0243187 A1* | 9/2013 | Horstmeyer | G09C 1/00 380/28 |
| 2019/0109719 A1* | 4/2019 | Davis | H04L 9/0869 |

(Continued)

OTHER PUBLICATIONS

NPL Search History (Year: 2024).*

(Continued)

*Primary Examiner* — Samson B Lemma
*Assistant Examiner* — Richard W Cruz-Franqui
(74) *Attorney, Agent, or Firm* — GATES & COOPER LLP

(57) ABSTRACT

A communication system including a first detector; a first scattering medium; a second detector; an intensity modulator; a second scattering medium; wherein electromagnetic radiation transmitted from a first spot at the first scattering medium, and scattered by and through the first scattering medium and then the second scattering medium, forms a first speckle pattern detected by the second detector. The intensity modulator outputs a second spot of electromagnetic radiation representing the "ones" in a data stream at locations of the bright speckles (or at locations of the dark speckles to represent the "zeros" in the data stream) so that the electromagnetic radiation, transmitted from the second spot and scattered by and through the second scattering medium and then the first scattering medium, forms one or more second bright or dark speckles on the first detector. The data stream can be constructed from the second bright or dark speckles.

20 Claims, 13 Drawing Sheets

(56) References Cited

U.S. PATENT DOCUMENTS

| | | | |
|---|---|---|---|
| 2020/0186350 A1* | 6/2020 | Wentz | H04L 9/3247 |
| 2020/0356085 A1* | 11/2020 | Wentz | H04L 9/0866 |
| 2021/0080742 A1 | 3/2021 | Ruan et al. | |
| 2021/0091952 A1* | 3/2021 | Wentz | H04L 9/3278 |
| 2024/0015033 A1* | 1/2024 | Davies | H04L 9/0866 |

OTHER PUBLICATIONS

Horstmeyer, Physical Key-Protected One-Time Pad (2013) (Year: 2013).*

Popoff, S.M., "Measuring the Transmission Matrix in Optics: An Approach to the Study and Control of Light Propagation in Disordered Media", Physical Review Letters, 2010, pp. 100601-1-100601-4, vol. 104.

Ruan, H., et al., "Optical information transmission through complex scattering media with optical-channel-based intensity streaming", Nature Communications, 2021, pp. 1-10, vol. 12, No. 2411.

Shannon, C.E., A Mathematical Theory of Communication, The Bell System Technical Journal, 1948, pp. 623-656.

\* cited by examiner

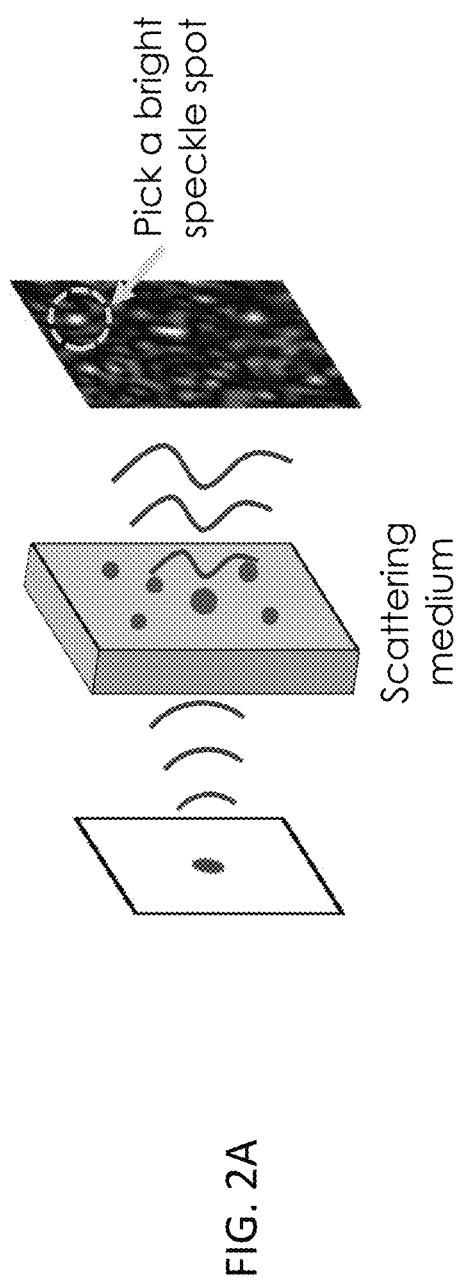
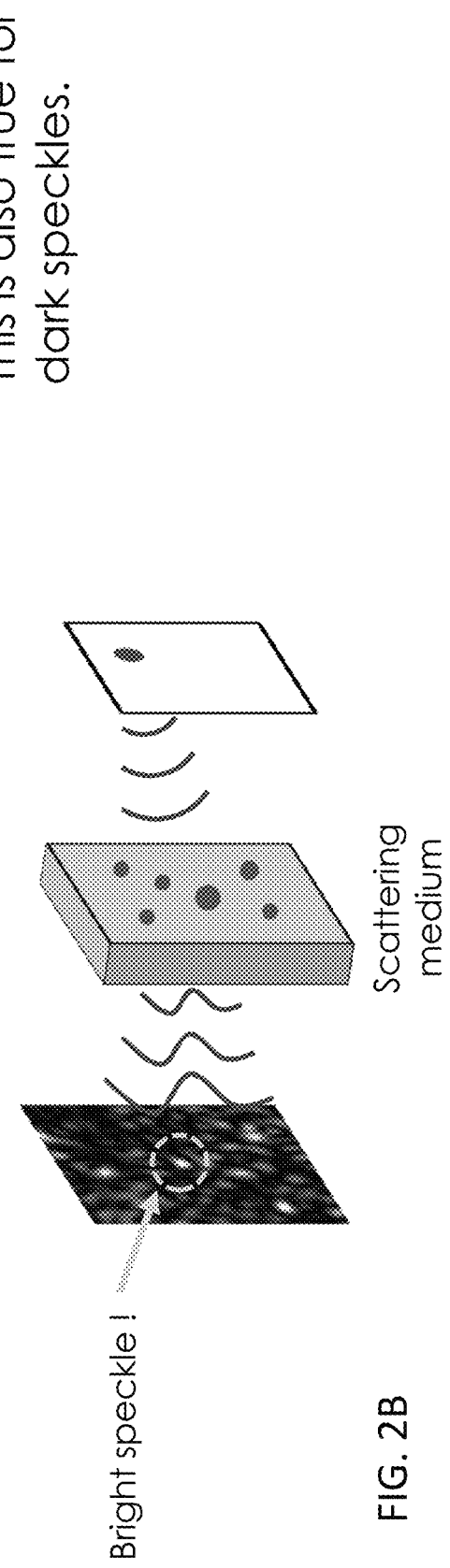
FIG. 2A
FIG. 2B

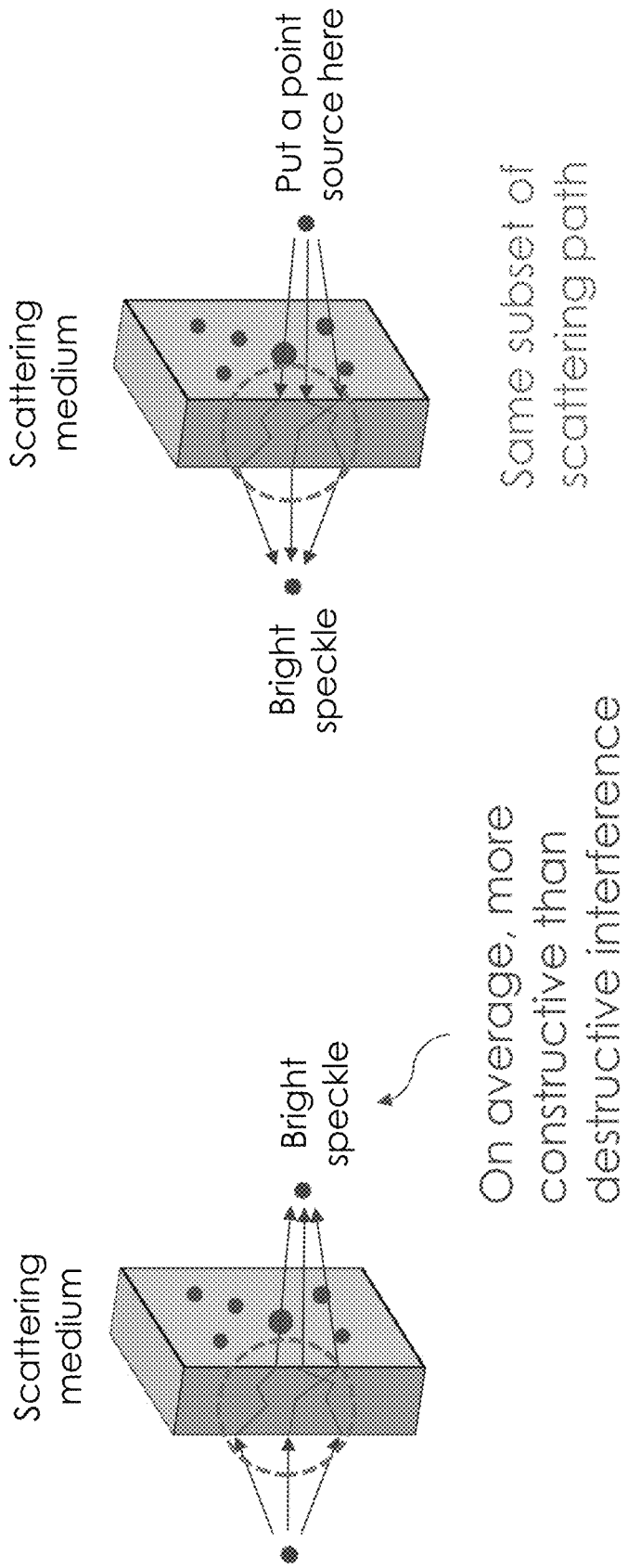

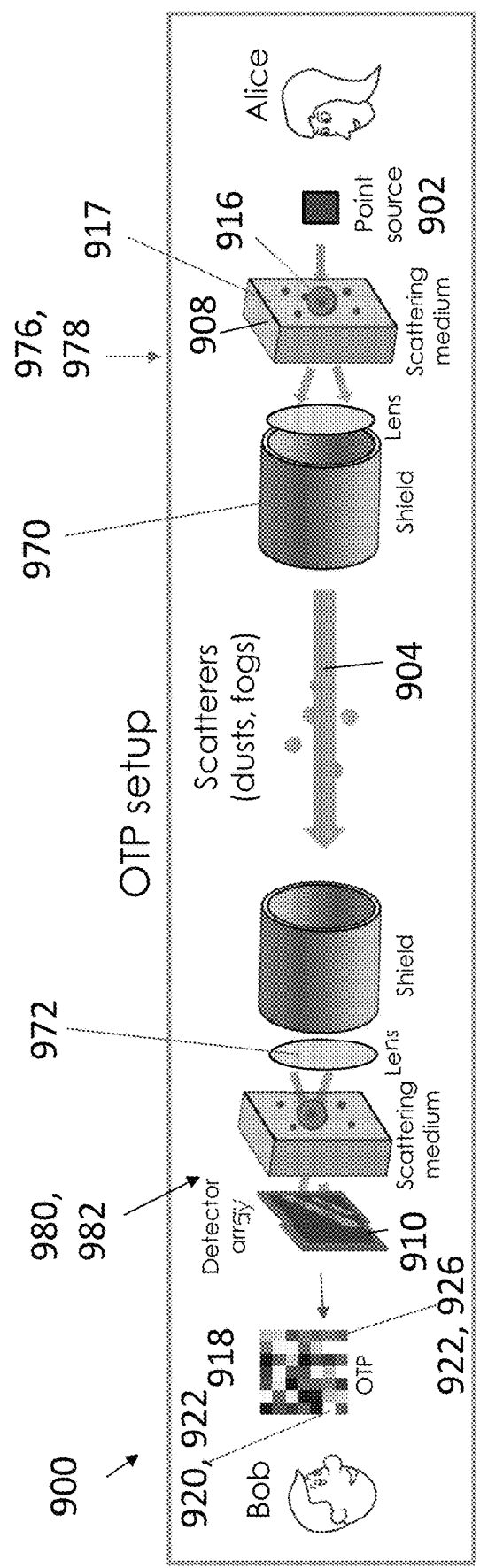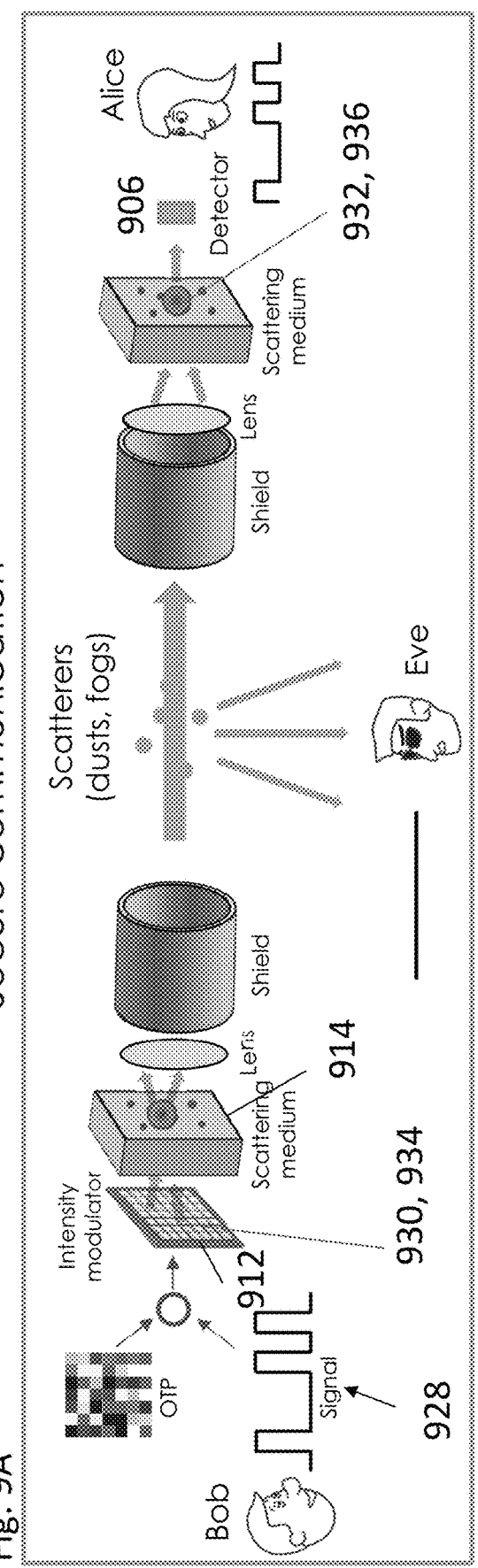
Fig. 9A
Fig. 9B

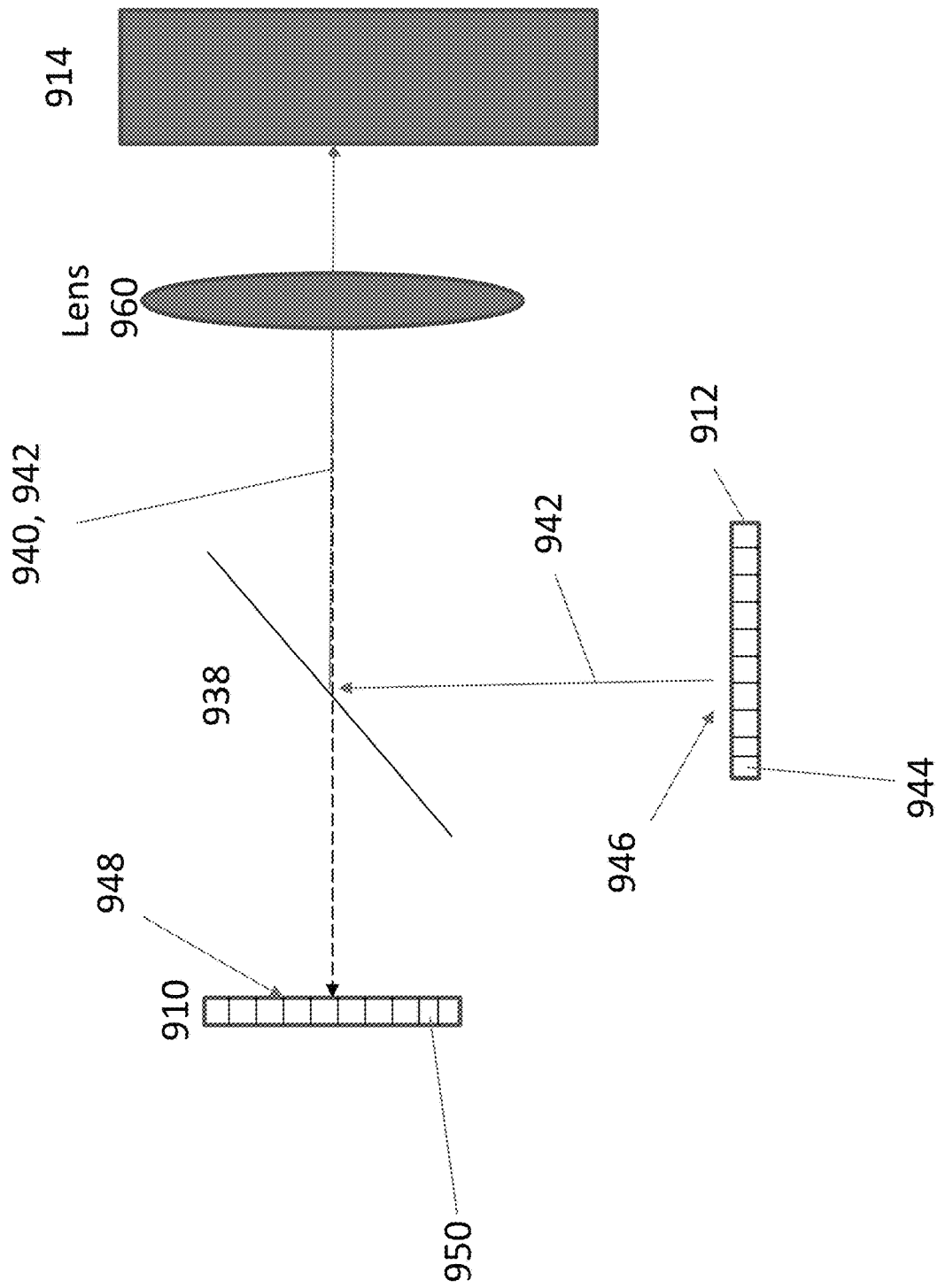

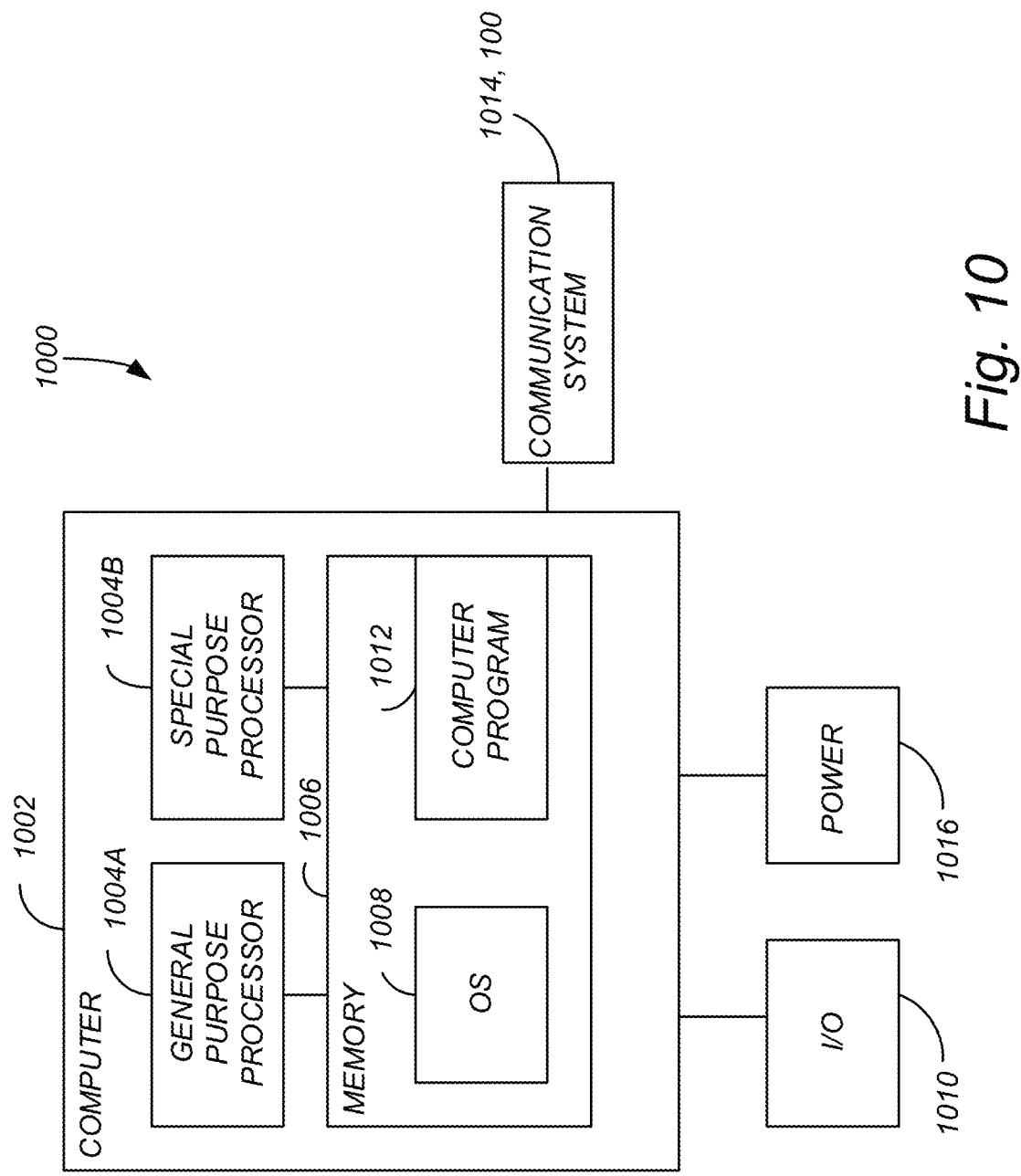

OPTICAL CHANNEL INTENSITY STREAMING ENCRYPTION

CROSS REFERENCE TO RELATED APPLICATIONS

This application claims the benefit under 35 USC 119(e) of and commonly assigned U.S. Provisional Patent Application Ser. No. 63/084,336, filed Sep. 28, 2020, by Jian Xu and Changhuei Yang, entitled "OPTICAL CHANNEL INTENSITY STREAMING ENCRYPTION," (CIT-8352-P2), which application is incorporated by reference herein.

BACKGROUND OF THE INVENTION

1. Field of the Invention

The present invention relates to communication systems and methods of making the same.

2. Description of the Related Art

Encryption is one of a variety of methods used to ensure secure transmission of information. Asymmetric cryptography, a widely used encryption method, relies on the high computational complexity required to decode the information (if the eavesdropper does not have the correct key). However, recently developed quantum computers now demonstrate quantum supremacy and may potentially make it computationally possible to break the encryption formed using asymmetric cryptography. What is needed are more secure methods for encrypting communications. The present disclosure satisfies this need.

SUMMARY OF THE INVENTION

Illustrative embodiments of the inventive subject matter disclosed herein include, but are no limited to, the following.

1. A communication system, comprising:
a first source of electromagnetic radiation;
a first detector;
a first scattering medium electromagnetically coupled to the first source and the first detector;
a second detector;
an intensity modulator;
a second scattering medium electromagnetically coupled to the second detector and the intensity modulator; wherein:
the first source forms a first spot of the electromagnetic radiation at the first scattering medium, so that the electromagnetic radiation, transmitted from the spot and scattered through the first scattering medium and the second scattering medium, forms a first speckle pattern comprising one or more first bright speckles at one or more first locations and one or more second dark speckles at one or more second locations;
the second detector detects one or more of the speckles at one or more of the locations;
the intensity modulator receiving data comprising a stream of one or more bits comprising one or more "ones" and one or more "zeros," forms at least one of:
one or more second spots of electromagnetic radiation representing the "ones" at each of one or more of the first locations, so that the electromagnetic radiation, transmitted from the one or more second spots and scattered through the second scattering medium and then the first scattering medium, forms one or more second bright speckles on the first detector; or one or more third spots of the electromagnetic radiation representing the "zeros" at each of the one or more second locations, so that the electromagnetic radiation transmitted from the one or more third spots at the second locations through the second scattering medium and then the first scattering medium, forms one or more second dark speckles on the first detector; and
a computer connected to the second detector and constructing the data stream by associating the one or more dark speckles with the "zeros" and the one or more bright speckles with the "ones."

2. The communication system of example 1, wherein the first source of electromagnetic radiation comprises a laser or light emitting diode and a lens or mirror focusing the electromagnetic radiation so as to form the first spot.

3. The communication system of example 1 or 2, wherein the first source of electromagnetic radiation comprises a second intensity modulator.

4. The communication system of example 1, 2, or 3, wherein the first spot, the one or more second spots, and the one or more third spots each comprise a point source of the electromagnetic radiation.

5. The communication system of any of the examples 1-4, further comprising:
a first station at a first station location, the first station comprising the first source, the first detector, and the first scattering medium; and
a second station at a second station location, the second station comprising the spatial light modulator, the second detector, and the second scattering medium;
wherein the first station comprises a first transmitter comprising the first source and a first receiver comprising the first detector; and
wherein the second station comprises a second transmitter comprising the spatial light modulator and the second receiver comprises the second detector.

6. The communication system of example 5, wherein the first station and second station are separated by a line of sight and the electromagnetic radiation is transmitted between the first scattering medium and the second scattering medium along the line of sight.

7. The communication system of example 5, wherein the first station and second station are separated by an optical fiber and the electromagnetic radiation is transmitted between the first scattering medium and the second scattering medium along the optical fiber.

8. The communication system of any of the examples 1-7, wherein the scattering medium comprises glass.

9. The communication system of any of the examples 1-8, wherein the computer arranges the zeros and the ones in the data stream according to the chronological order the second bright speckles and the second dark speckles are detected on the detector.

10. The system of any of the examples 1-9, further comprising one or more lenses, mirrors, or collimators focusing or collimating the electromagnetic radiation so as to form the first spot or image or transmit the second spots or the third spots on the second scattering medium or to/from the second detector and the intensity modulator.

11. The system of any of the examples 1-10, further comprising a shield or aperture suppressing transmission of noisy electromagnetic radiation that does not comprise the electromagnetic radiation being used to transmit the data stream.

12. The system of any of the examples 1-11, wherein the first detector and/or the second detector each comprise an array of pixels and the locations are the locations or address of the pixels on the array that receive the speckles.

13. A computer implemented method for communicating, comprising:

transmitting electromagnetic radiation from a first source of electromagnetic radiation coupled to a first detector and a first scattering medium;

forming a first spot of the electromagnetic radiation at the first scattering medium, so that the electromagnetic radiation, transmitted from the first spot and scattered through the first scattering medium and the second scattering medium, forms a first speckle pattern comprising one or more first bright speckles at one or more first locations and one or more second dark speckles at one or more second locations;

detecting, on a second detector, one or more of the speckles at one or more of the locations;

receiving, on a spatial light modulator, data comprising a stream of one or more bits comprising one or more "ones" and one or more "zeros,"

outputting, from the spatial light modulator, at least one of:

one or more second spots of electromagnetic radiation representing the "ones" at each of one or more of the first locations, so that the electromagnetic radiation, transmitted from the one or more second spots and scattered through the second scattering medium and then the first scattering medium, forms one or more second bright speckles on the first detector; or one or more third spots of the electromagnetic radiation representing the "zeros" at each of the one or more second locations, so that the electromagnetic radiation transmitted from the one or more third spots at the second locations through the second scattering medium and then the first scattering medium, forms one or more second dark speckles on the first detector; and constructing, using a computer connected to the second detector, the data stream by associating the one or more second dark speckles with the "zeros" and the one or more second bright speckles with the "ones."

14. A computer implemented system, comprising:

a computer comprising one or more processors; one or more memories; and one or more programs stored in the one or more memories, wherein the one or more programs executed by the one or more processors:

constructing a data stream by associating each one or more second dark speckles with a "zero" and the one or more second bright speckles a "one," the second dark speckles and the second bright speckles obtained by a process comprising:

transmitting electromagnetic radiation from a first source of electromagnetic radiation coupled to a first detector and a first scattering medium;

forming a first spot of the electromagnetic radiation at the first scattering medium, so that the electromagnetic radiation, transmitted from the first spot and scattered through the first scattering medium and the second scattering medium, forms a first speckle pattern comprising one or more first bright speckles at one or more first locations and one or more second dark speckles at one or more second locations;

detecting, on a second detector, one or more of the speckles at one or more of the locations;

receiving, on an intensity modulator, data comprising a stream of one or more bits comprising the one or more "ones" and the one or more "zeros,"

outputting, from the intensity modulator, at least one of:

one or more second spots of electromagnetic radiation representing the "ones" at each of one or more of the first locations, so that the electromagnetic radiation, transmitted from the one or more second spots and scattered through the second scattering medium and then the first scattering medium, forms one or more second bright speckles on the first detector; or one or more third spots of the electromagnetic radiation representing the "zeros" at each of the one or more second locations, so that the electromagnetic radiation transmitted from the one or more third spots at the second locations through the second scattering medium and then the first scattering medium, forms one or more second dark speckles on the first detector.

15. The system of example 14, wherein the computer constructs a message comprising the data stream, wherein the message is transmitted from a second station in a communications system comprising:

a first station at a first station location, the first station comprising the first source, the first detector, and the first scattering medium; and the second station at a second station location, the second station comprising the spatial light modulator, the second detector, and the second scattering medium;

wherein the first station comprises a first transmitter comprising the first source and a first receiver comprising the first detector;

wherein the second station comprises a second transmitter comprising the spatial light modulator and the second receiver comprises the second detector.

16. The system of example 15 or 16, wherein the first station and second station are separated by a line of sight and the electromagnetic radiation is transmitted between the first scattering medium and the second scattering medium along the line of sight.

20. The system of example 15 or 16, wherein the first station and second station are separated by an optical fiber and the electromagnetic radiation is transmitted between the first scattering medium and the second scattering medium along the optical fiber.

21. The system or method of any of the examples, wherein the speckle pattern comprises a one time pad.

BRIEF DESCRIPTION OF THE DRAWINGS

Referring now to the drawings in which like reference numbers represent corresponding parts throughout:

FIG. 2A and FIG. 2B illustrate speckle mapping (bright-bright or dark-dark speckle mapping) during transmission from A to B (FIG. 2A) and from B to A (FIG. 2B).

FIG. 3A and FIG. 3B illustrate optical reciprocity using a transmission matrix approach, wherein FIG. 3A illustrates transmission from A to B and FIG. 3B illustrates transmission from B to A.

FIG. 4A and FIG. 4B illustrate optical reciprocity in terms of net constructive interference, wherein FIG. 4A shows transmission from A to B and FIG. 4B shows transmission from B to A.

FIG. 5A-5B illustrate bright spot/dark spot generation without wavefront shaping, wherein FIG. 5A shows null energy spot image (a1) and control image (a2) and FIG. 5B shows a bright spot image (b1) and control image (b2).

FIGS. 9A and 9B illustrate a line of sight communication using an OCIS encryption according to one or more embodiments of the present invention, wherein FIG. 9A illustrates OTP setup and FIG. 9B illustrates the secure communication.

FIG. 9C illustrates how the intensity modulator and the detector may be pixel matched.

FIG. 10 illustrates a computer for use with the communication system according to embodiments described herein.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized, and structural changes may be made without departing from the scope of the present invention.

Technical Description

Introduction

Figure 1:
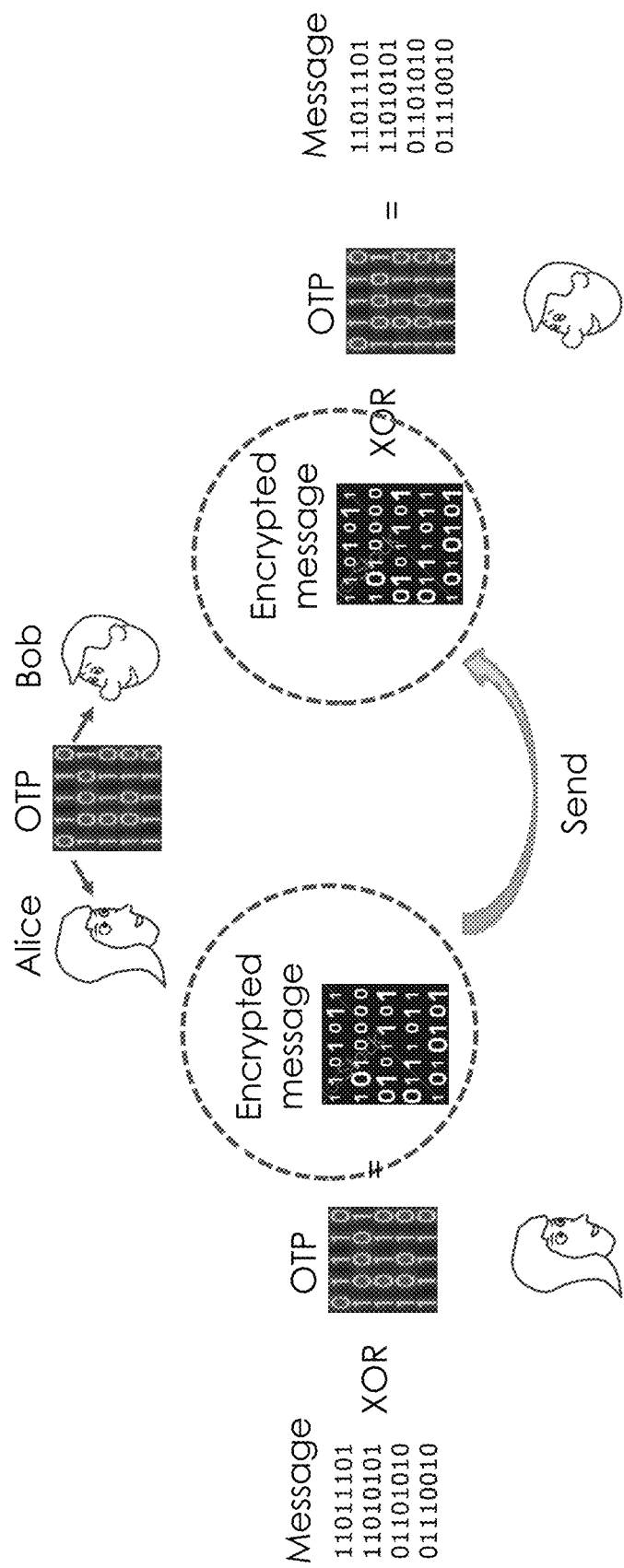
FIG. 1 illustrates forming an encrypted message by adding the message to a key comprising an OTP using an XOR operation. Alice can transmit the encrypted message to Bob so that interception of the encrypted message would contain zero useful information, if each bit in the OTP is used only once, each bit in the OTP is truly random, and the OTP is kept safe and promptly destroyed.

Shannon [1] has proved that the one time pad (OTP), one of the oldest encryption methods, has a perfect secrecy property. FIG. 1 illustrates interception of an OTP encrypted message (encrypted using an XOR operation) provides the eavesdropper with no additional information about the plaintext. Combining optical scattering and the OTP, we present a new optical technique that allows encryption of information at a physical level instead of at a digital level, so that the resulting encrypted information is harder or practically impossible to break. We term this method optical channel intensity streaming (OCIS) encryption.

Conventional OTP methods require the two parties to a communication to have a private channel to share the OTP before communication, which is challenging in practice. Here, we use optical reciprocity to realize the OTP sharing process without having a private channel. FIG. 2A and FIG. 2B illustrate optical reciprocity, wherein electromagnetic radiation outputted from a point source at a transmitter location, and scattered by a scattering medium, forms a speckle pattern at a receiver location (FIG. 2A). FIG. 2B illustrates positioning a point source at the position of one of the bright speckles (or at the position of a dark speckle) at the receiver location results in the observation of a bright speckle (dark speckle) at the transmitter location.

Figure 3A:
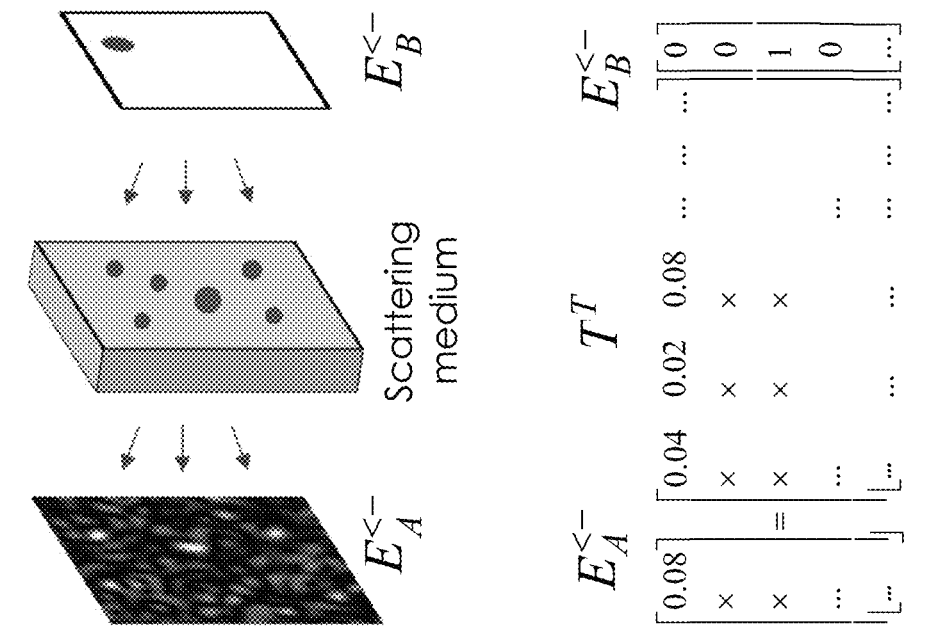
Figure 3B:
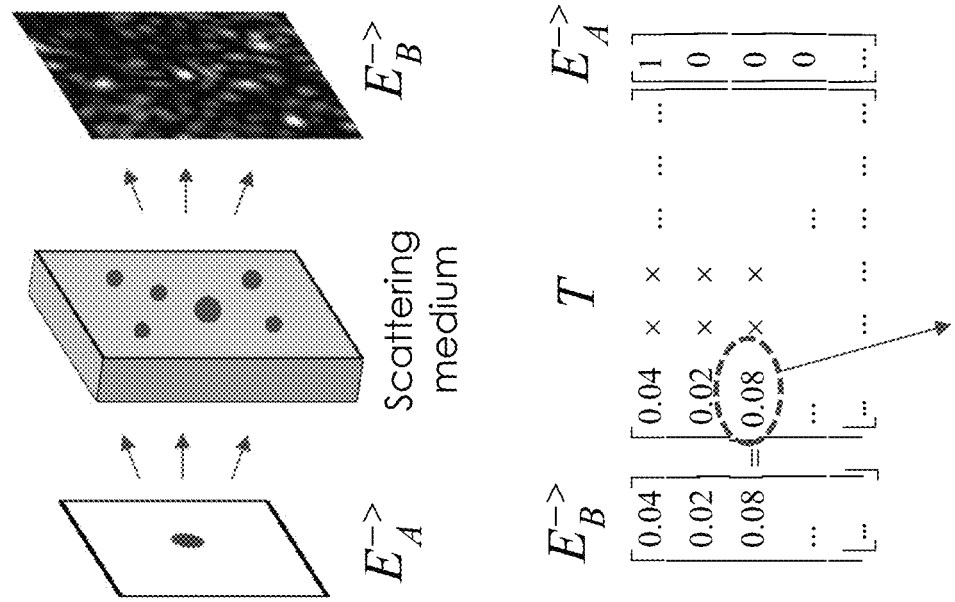

FIGS. 3A-3B illustrate the optical reciprocity using a transmission matrix T [2] approach relating the electric field at the transmitter ($E_A$) to the electric field at the receiver ($E_B$), during a transmission from A to B (FIG. 3A) and during a transmission from B to A (FIG. 3B). The transmission matrix T expresses the scattering of the electric field $E_A$ by the scattering medium to form the electric field $E_B$ during transmission from A to B (so that $E_B = T\ E_A$) and the transpose of the transmission matrix $T^T$ expresses the scattering of the electric field $E_B$ by the scattering medium to form the electric field $E_A$ during transmission from B to A (so that $E_A = T^T E_B$).

FIGS. 4A-4B illustrate the optical reciprocity using an interference approach. FIG. 4A illustrates the bright speckle at the receiver results from, on average, more constructive than destructive interference of the fields of the electromagnetic radiation transmitted from the point source at the transmitter. FIG. 4B illustrates a point source positioned at the location of the bright speckle will transmit electromagnetic radiation along the same subset of scattering paths that experienced the more constructive interference in the transmission from the point source at the transmitter illustrated in FIG. 4A.

Figures 5A, 5B:
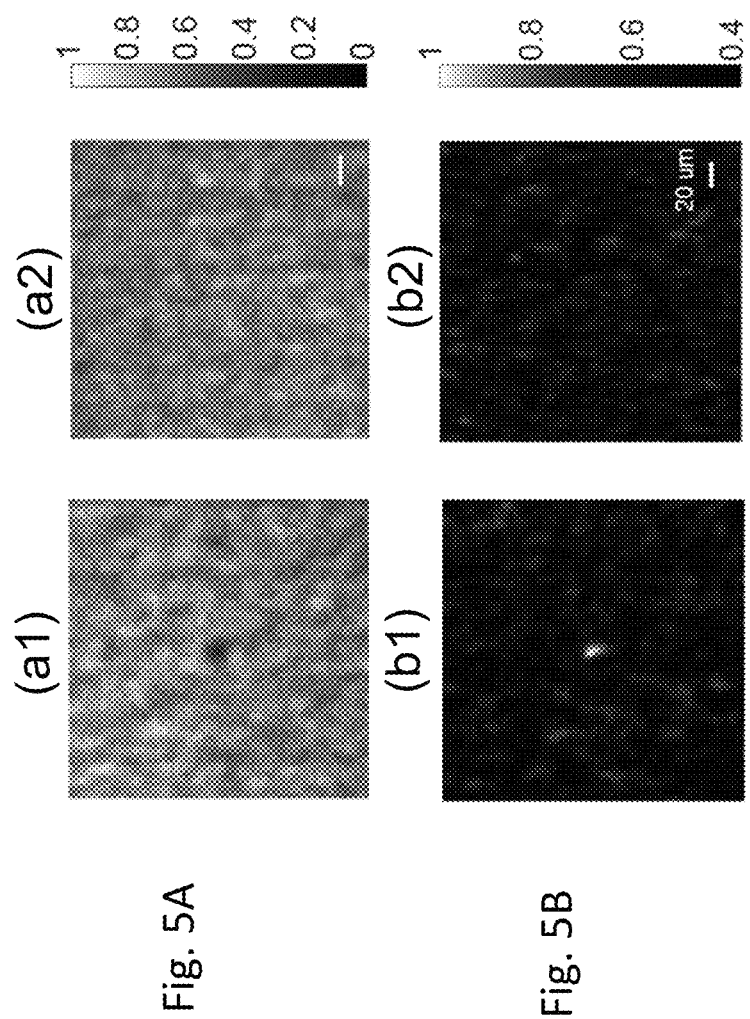

FIG. 5A-5B illustrates OCIS for null energy and bright spot display [3]. By injecting light into the low-throughput (high-throughput) optical channels, we can obtain a null energy (bright) spot on the target plane. (a) Null energy spot image and control image. (b) Bright spot image and control image.

Figure 6:
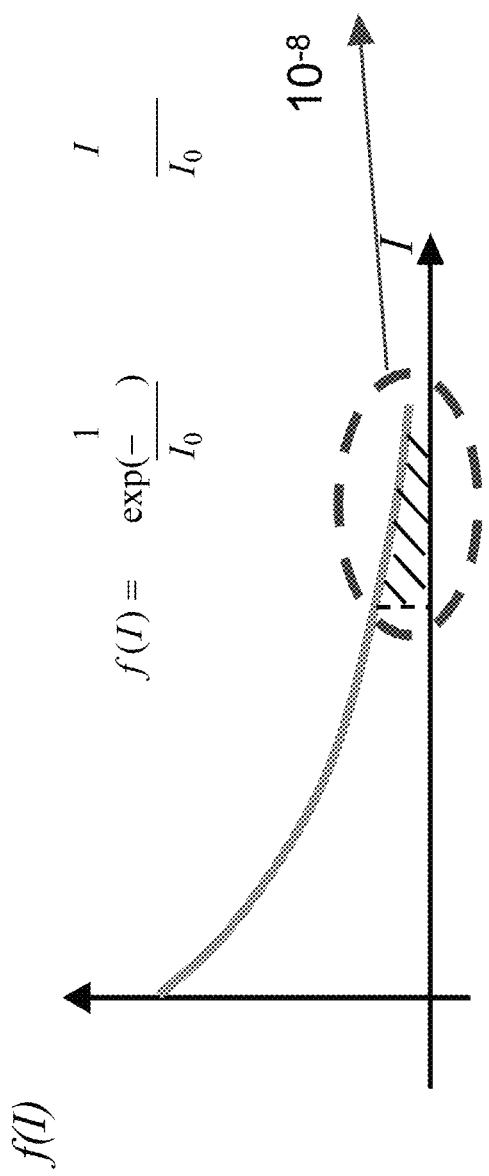
FIG. 6 illustrates the exponential distribution of speckle intensity of a bright spot in a speckle pattern.

FIG. 6 illustrates exponential distribution of the speckle intensity of a speckle pattern formed by irradiating the scattering medium with a point source. For a speckle field with $10^4 \times 10^4$ speckles, the brightest speckle is $\sim 8 \ln(10) = 18$ times brighter than the surrounding speckles [4]

Example: Optical One Time Pad

Figure 7:
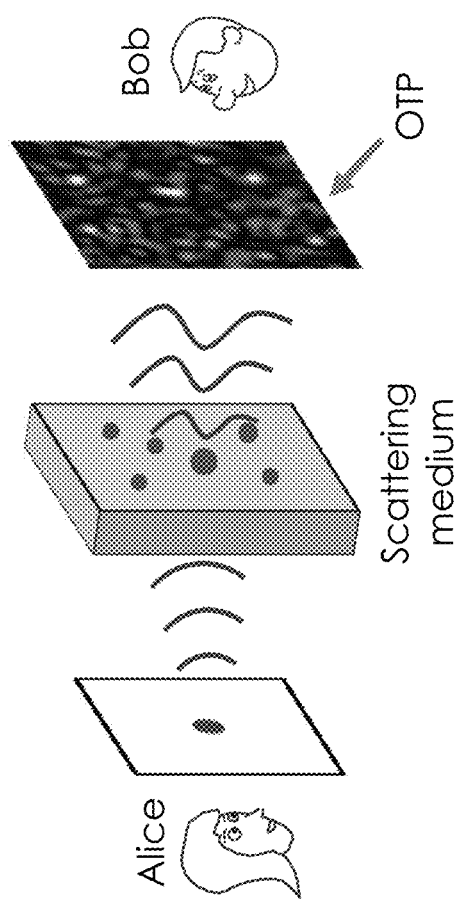
FIG. 7 illustrates an optical one time pad.

FIG. 7 illustrates using a speckle pattern as a one time pad. Alice transmits electromagnetic radiation from a point source and through scattering medium to Bob. Bob sends information to Alice by selecting a bright spot or a dark spot in the speckle pattern. For example, to send a "1" bit, Bob selects a bright speckle and positions a point source at the location of the bright speckle. Alice will then observe a bright spot indicating the transmission of the "1" bit. In one or more examples, Alice has no access to the scattering medium and the OTP can be refreshed by knocking or moving the scattering medium.

Example: Line of Sight Communication Using Speckle Pattern as an OTP

Figure 8:
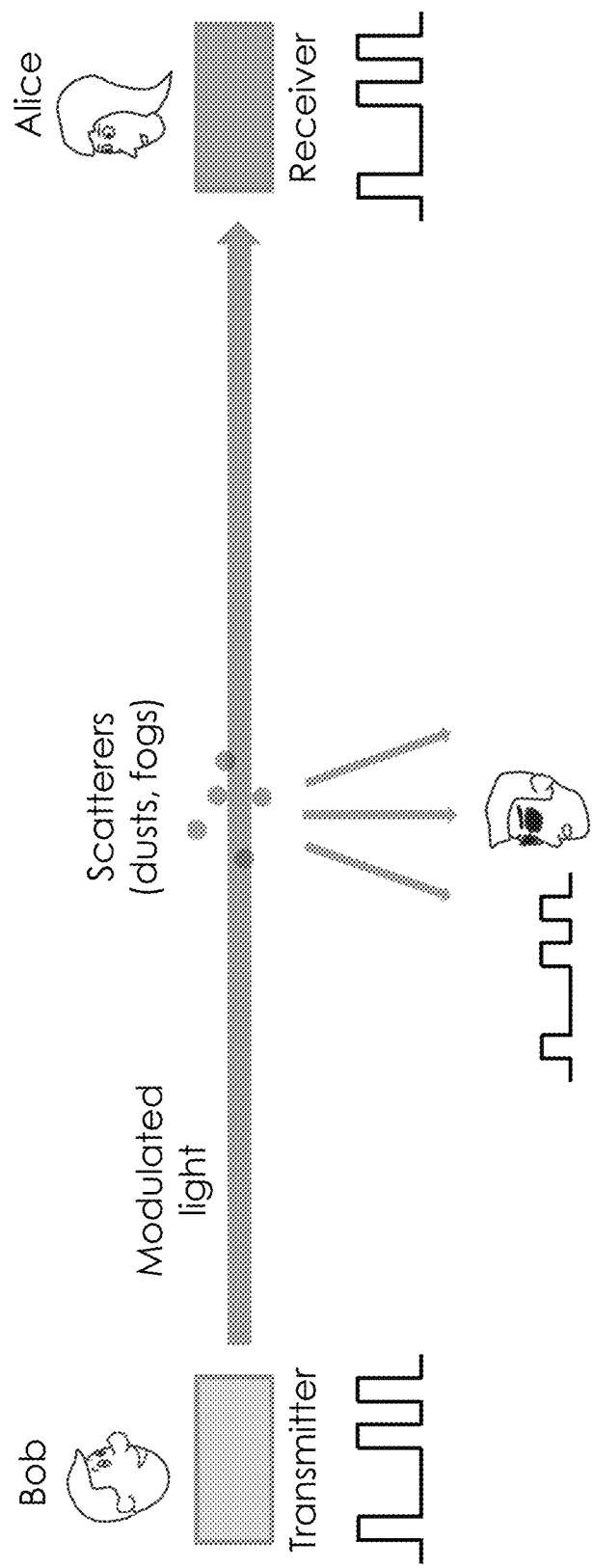
FIG. 8 illustrates a conventional line of sight communication from a transmitter (Bob), through scatterers such as fog and/or dust, to a receiver (Alice).

FIG. 8 illustrates a conventional line of sight communication from a transmitter (Bob) through scatterers, comprising fog and/or dust, to a receiver (Alice). Although the electromagnetic radiation transmitted by Bob is modulated, an eavesdropper (Eve) can receive the same signal sequence as Alice.

FIGS. 9A-9B illustrate a line of sight communication using OCIS encryption and comprises the following steps. FIG. 9A illustrates OTP setup wherein Alice, one party of the communication, first illuminates a scattering medium with a point source and the other communication party, Bob, will receive a speckle pattern. Each bright speckle spot on the camera will represent a positional link through the scattering medium back to the Alice's initial point source. In other words, if Bob places a point source at that bright speckle location, Alice will receive a bright speckle (FIG. 9B). The opposite is true for the dark speckle spots on Bob's camera. Placing a point source at one of these dark points will cause Alice to receive a dark speckle. The speckle pattern recorded on the camera can therefore serve as an OTP. Whenever Bob wants to send a '1' bit (or '0' bit), he transmits by putting a point source at one of the bright speckle spots (or a dark speckle spot). In this case, an eavesdropper Eve who intercepts the signal will receive an uncorrelated bit sequence. As long as Bob only uses each bright speckle once, the security of the OTP would be preserved. This scheme can be implemented in free space communications, fiber communications as well as other possible conditions. The system further comprises a shield to block transmissions of electromagnetic radiation that are not involved in the communication or that do not originate from Alice or Bob.

To further prevent an eavesdropper from getting the information, Bob can also send a '1' bit by putting multiple spatially incoherent point sources at different bright speckle spots. In this case, the signal sequence Eve receives will be a flat sequence instead of an uncorrelated sequence, due to averaging effects of multiple incoherent sources. In addition, OCIS encryption does not require the two parties to store the OTP, which is usually long in conventional cases to ensure security. Both parties can refresh the OTP once the OTP is exhausted.

FIG. 9C illustrates how the intensity modulator 912 in FIG. 9B is pixel-to-pixel matched with the detector array 910 in FIG. 9A. A beam splitter 938 is electromagnetically coupled to the scattering medium 914 so as to couple the scattered electromagnetic radiation 940 (transmitted from Alice or Bob) outputted from the scattering medium into the detector array and couple the electromagnetic radiation 942 outputted from the intensity modulator onto the scattering medium. The detector array 910 at one port is well-aligned to the intensity modulator 912 at another port to achieve the pixel matching wherein the each of the pixels 944 on the intensity modulator are optically located at the same position on an image plane 946, 948 as a different one of the pixels 950 of the detector array 910. (e.g., each pixel 944 of the intensity modulator is at a position on an image plane 946 that is optically equivalent to the position of one of the sensor pixels 950 on an equivalent image plane (detector plane 948) of the detector. In one or more embodiments, the intensity modulator comprises an array of lasers, laser beam sources, or Light Emitting Diodes, wherein each laser, source, or LED comprises a different pixel 944, a digital micromirror device (DMD) comprising the pixels 944, or a spatial light modulator comprising the pixels 944. In one or more examples, each of the pixels 944 are aligned (1:1 pixel to pixel match) and imaged onto one of the sensor pixels 950 using a lens 960. In this way, since the measurement of the speckle pattern happens at the image plane (detector plane 948) at the location of the detector, the spots 930 transmitted by Bob must be at the image plane of the detector (or at an image plane 946 optically equivalent to the image plane of the detector).

Advantages and Improvements

Embodiments of a OCIS encryption system described herein provide a physical layer encryption that is not computationally breakable, and it does not require the communication parties to store the OTP. These features provide higher secrecy level than conventional widely used digital encryption.

Example Computer Hardware

FIG. 10 illustrates an exemplary system 1000 that could be used to implement processing elements needed to control the communication system 100 or perform processes described herein.

The computer 1002 comprises a processor 1004 (general purpose processor 1004A and special purpose processor 1004B) and a memory, such as random access memory (RAM) 1006. Generally, the computer 1002 operates under control of an operating system 1008 stored in the memory 1006, and interfaces with the user/other computers to accept inputs and commands (e.g., analog or digital signals) and to present results through an input/output (I/O) module 1010. The computer program application 1012 accesses and manipulates data stored in the memory 1006 of the computer 1002. The operating system 1008 and the computer program 1012 are comprised of instructions which, when read and executed by the computer 1002, cause the computer 1002 to perform the operations herein described. In one embodiment, instructions implementing the operating system 1008 and the computer program 1010 are tangibly embodied in the memory 1006, thereby making a computer program product or article of manufacture. As such, the terms "article of manufacture," "program storage device" and "computer program product" as used herein are intended to encompass a computer program accessible from any computer readable device or media.

In one embodiment, computer 1002 comprises one or more field programmable gate arrays (FPGAs) or application specific integrated circuits (ASIC). In some examples, the computer comprises a server or cloud computer wirelessly connected to the communication system or connected via the internet.

System and Method Embodiments

1. FIG. 9 illustrates an example of a communication system 900, comprising:

a first source 902 of electromagnetic radiation 904;

a first detector 906;

a first scattering medium 908 electromagnetically coupled to the first source and the first detector;

a second detector 910;

an intensity modulator 912;

a second scattering medium 914 electromagnetically coupled to the second detector and the intensity modulator; wherein:

the first source forms a first spot 916 of the electromagnetic radiation at the first scattering medium (e.g., on an input face 917 of the scattering medium), so that the electromagnetic radiation 940, transmitted from the first spot and scattered by and through the first scattering medium and the second scattering medium, forms a first speckle pattern 918 comprising one or more first bright speckles 920 at one or more first locations 922 on an image plane and one or more second dark speckles 924 at one or more second locations 926 on the image plane;

the second detector detects and locates one or more of the speckles at one or more of the locations;

an intensity modulator receiving data comprising a signal (e.g., stream 928 of one or more bits comprising one or more "ones" and one or more "zeros") forms at least one of:

one or more second spots 930 of electromagnetic radiation representing the "ones" at each of one or more of the first locations 922, so that the electromagnetic radiation 942, transmitted from the one or more second spots and scattered by and through the second scattering medium and then the first scattering medium, forms one or more second bright speckles 932 on the first detector; or one or more third spots 934 of the electromagnetic radiation representing the "zeros" at each of the one or more second locations, so that the electromagnetic radiation, transmitted from the one or more third spots at the second locations and scattered by and through the second scattering medium and then the first scattering medium, forms one or more second dark speckles 936 on the first detector; and a computer connected to the second detector and constructing the data stream by associating the one or more dark speckles with the "zeros" and the one or more bright speckles with the "ones."

2. The communication system of example 1, wherein each of the spots are at a position on an image plane 946 that is electromagnetically (e.g., optically) equivalent to the position of one of the locations on an equivalent image plane 948 of the second detector 910.

3. The communication system of example 1, or 2, wherein each of the spots are at a pixel 944 at an image plane 946 of the intensity modulator that is electromagnetically equivalent to the position of one of the pixels 950 on an equivalent image plane 948 of the second detector 910.

4. The communication system of any of the examples 1-3, wherein the first spots, the second spots, and the third spots comprise the electromagnetic radiation having the same wavelength (e.g., but not limited to, visible or infrared wavelengths, or telecommunication wavelengths, e.g., in a range of 400 nm-10 microns).

5. The communication system of any of the examples 1-4, wherein the first source of electromagnetic radiation comprises a laser or light emitting diode and a lens or mirror focusing the electromagnetic radiation so as to form the first spot comprising a focus.

6. The communication system of any of the examples 1-5, wherein the first source of electromagnetic radiation comprises a second spatial light modulator or intensity modulator.

7. The communication system of any of the examples 1-6, wherein the first spot, the one or more second spots, and the one or more third spots each comprise a point source of the electromagnetic radiation characterized such that:

if a pixel 950 of the second detector 910 has a pixel size smaller than a speckle 920 (e.g., speckle grain) in the speckle pattern, the point source has no spatial extension as compared to the size of the speckle, and if a pixel 950 of the second detector 910 has a pixel size larger than a speckle 920 (e.g., speckle grain), the point source has no spatial extension as compared to a size of the pixel 920.

8. The communication system of any of the examples 1-7, further comprising:

a first station 976 at a first station location 978, the first station comprising the first source, the first detector, and the first scattering medium (and optionally a shield 970; and a second station 980 at a second station location 982, the second station comprising the spatial intensity modulator, the second detector, and the second scattering medium;

wherein the first station comprises a first transmitter comprising the first source and a first receiver comprising the first detector; and wherein the second station comprises a second transmitter comprising the intensity modulator and the second receiver comprising the second detector.

9. The communication system of any of the examples 1-8, wherein the first station comprises another one of the second transmitter for transmitting the electromagnetic radiation 904 to the second station and another one of the second receiver for receiving the electromagnetic radiation 904 from the second station, and the second station optionally comprises another one of the first transmitter comprising the first source.

10. The communication system of example 9, wherein the first station and second station are separated by a line of sight and the electromagnetic radiation 904 is transmitted between the first scattering medium and the second scattering medium along the line of sight (e.g., through a medium consisting essentially of air or atmosphere (e.g., comprising air, fog or dust).

11. The communication system of example 10, wherein the first station and second station are separated by an optical fiber and the electromagnetic radiation 904 is transmitted between the first scattering medium and the second scattering medium through the optical fiber.

12. The communication system of any of the examples 1-11, wherein the scattering mediums comprise or consist essentially of glass or an optical fiber (e.g., multimode fiber), e.g., the optical fiber in example 10.

13. The communication system of any of the examples 1-12, wherein the computer arranges the zeros and the ones in the data stream 928 according to the chronological or sequential order the second bright speckles and the second dark speckles are detected on the first detector.

14. The system of any of the examples 1-13, further comprising one or more lenses 960, 972 mirrors, or collimators forming the first spot or imaging or transmitting the second spots or the third spots onto the second scattering medium 914 or to/from the detector 910 and intensity modulator 912.

15. The system of any of the examples 1-14, further comprising one or more lenses 972, mirrors, collecting the electromagnetic radiation 904 transmitted to the scattering medium, on the first scattering medium or the second scattering medium so as to form the speckle patterns.

16. The system of any of the examples 1-15, further comprising a shield 970 or aperture at each input to the scattering medium 914 receiving the electromagnetic radiation 904 transmitted from the other of the scattering medium 908, the shield or the aperture suppressing transmission of noisy electromagnetic radiation that does not comprise the electromagnetic radiation being used to transmit the data stream.

17. The system of any of the examples 1-16, wherein the detectors 910 each comprise an array of pixels 950 and the locations are the locations or address of the pixels on the array that receive each of the speckles. In one or more examples, the detector comprises a camera.

Figure 11:
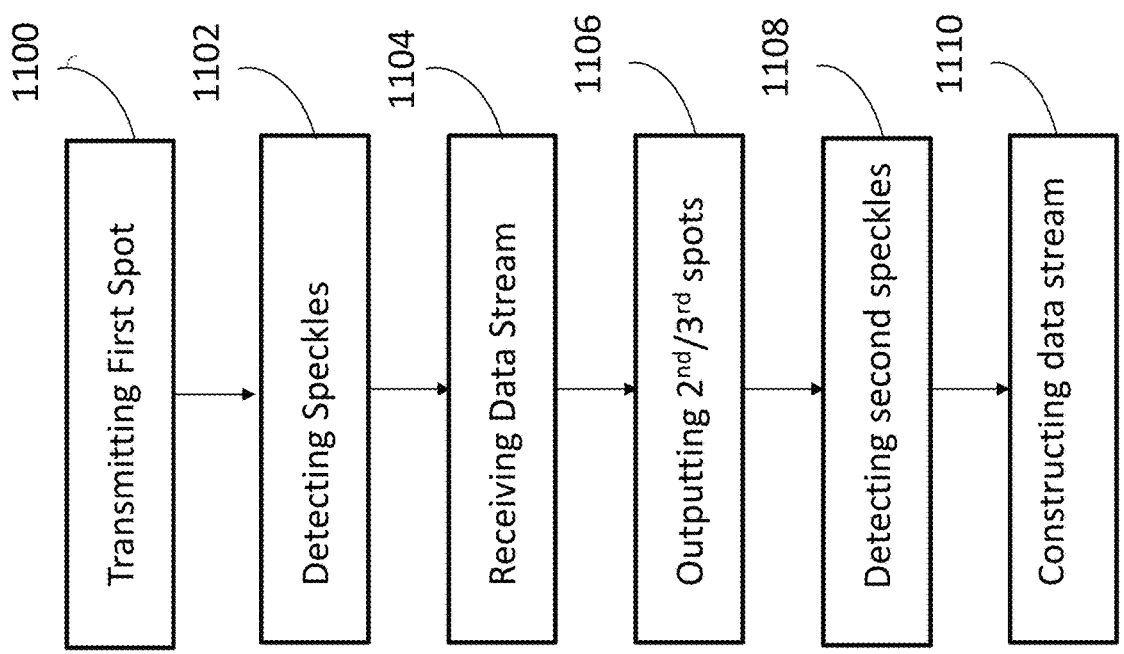
FIG. 11 is a flowchart illustrating a method of communicating using a communication system according to embodiments described herein.

18. FIG. 11 illustrates a computer implemented method for communicating, comprising the following steps.

Block 1100 represents transmitting electromagnetic radiation from a first source of electromagnetic radiation coupled to a first detector and a first scattering medium, so as to form a first spot of the electromagnetic radiation at the first scattering medium, so that the electromagnetic radiation, transmitted from the first spot and scattered through the first scattering medium and the second scattering medium, forms a first speckle pattern comprising one or more first bright speckles at one or more first locations and one or more second dark speckles at one or more second locations.

Block 1102 represents detecting, on a second detector, one or more of the speckles at one or more of the locations.

Block 1104 represents receiving, on an intensity modulator, data comprising a stream of one or more bits comprising one or more "ones" and one or more "zeros," (e.g., wherein the data stream comprises a message).

Block 1106 represents outputting, from the intensity modulator, at least one of:

one or more second spots of electromagnetic radiation representing the "ones" at each of one or more of the first locations, so that the electromagnetic radiation, transmitted from the one or more second spots and scattered through the second scattering medium and then the first scattering medium, forms one or more second bright speckles detected on the first detector (Block 1108); or one or more third spots of the electromagnetic radiation representing the "zeros" at each of the one or more second locations, so that the electromagnetic radiation transmitted from the one or more third spots at the second locations through the second scattering medium and then the first scattering medium, forms one or more second dark speckles detected on the first detector (Block 1108); and Block 1110 represents constructing, using a computer connected to the second detector, the data stream by associating the one or more second dark speckles with the "zeros" and the one or more second bright speckles with the "ones."

19. The method of example 18, wherein each of the speckles are used only once to transmit a data stream (i.e., the spots of electromagnetic radiation are not located on the speckle after the speckle has been used to transmit a data stream or a bit in a data stream).

20. A computer implemented system, comprising:

FIG. 10 illustrates a computer comprising one or more processors; one or more memories; and one or more programs stored in the one or more memories, wherein the one or more programs executed by the one or more processors:

constructing a data stream by associating each of one or more dark speckles with a "zero" and each of one or more bright speckles with a "one," the dark speckles and the bright speckles obtained by a process comprising:

transmitting electromagnetic radiation from a first source of electromagnetic radiation coupled to a first detector and a first scattering medium;

forming a first spot of the electromagnetic radiation at the first scattering medium, so that the electromagnetic radiation, transmitted from the first spot and scattered through the first scattering medium and the second scattering medium, forms a first speckle pattern comprising one or more first bright speckles at one or more first locations and one or more second dark speckles at one or more second locations;

detecting, on a second detector, one or more of the speckles at one or more of the locations;

receiving, on an intensity modulator, data comprising a stream of one or more bits comprising the one or more "ones" and the one or more "zeros,"

outputting, from the intensity modulator, at least one of: one or more second spots of electromagnetic radiation representing the "ones" at each of one or more of the first locations, so that the electromagnetic radiation, transmitted from the one or more second spots and scattered through the second scattering medium and then the first scattering medium, forms one or more second bright speckles on the first detector; or one or more third spots of the electromagnetic radiation representing the "zeros" at each of the one or more second locations, so that the electromagnetic radiation transmitted from the one or more third spots at the second locations through the second scattering medium and then the first scattering medium, forms one or more second dark speckles on the first detector.

20. The computer system of example 19 in the communication system (comprising a data link between a first station and second station) of any of the examples 1-19.

21. The communication system of any of the examples 1-20, wherein the intensity modulator comprises an array of lasers, light emitting diodes (LEDs, a digital micromirror device (DMD), or a spatial light modulator, or a modulator of intensity of the electromagnetic radiation.

Figure 12:
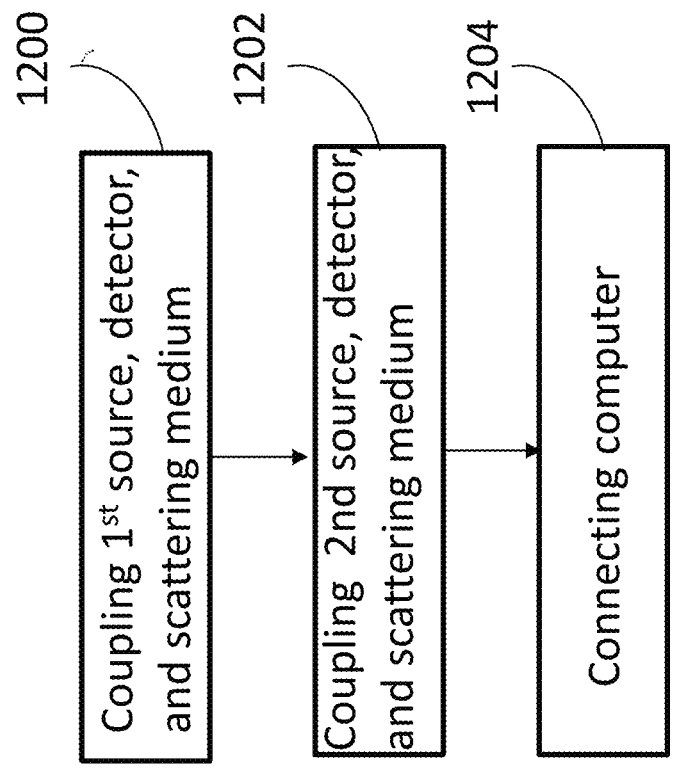
FIG. 12 is a flowchart illustrating a method of making a communication system according to embodiments described herein.

22. FIG. 12 is a flowchart illustrating a method of making the communication system of any of the examples 1-21. The method comprises the following steps:

Block 1200 represents coupling/connecting a first source 902 of electromagnetic radiation 904; a first detector 906; and a first scattering medium 908;

Block 1202 represents coupling/connecting a second scattering medium 914 to a second detector and an intensity modulator; so that:

the first source forms a first spot 916 of the electromagnetic radiation at the first scattering medium (e.g., on an input face 917 of the scattering medium), so that the electromagnetic radiation 904, transmitted from the first spot and scattered by and through the first scattering medium and the second scattering medium, forms a first speckle pattern 918 comprising one or more first bright speckles 920 at one or more first locations 922 on an image plane and one or more second dark speckles 924 at one or more second locations 926 on the image plane;

the second detector detects and locates one or more of the speckles at one or more of the locations;

the intensity modulator receiving data comprising a stream 928 of one or more bits comprising one or more "ones" and one or more "zeros," forms at least one of:

one or more second spots 930 of electromagnetic radiation representing the "ones" at each of one or more of the first locations, so that the electromagnetic radiation 942, transmitted from the one or more second spots and scattered by and through the second scattering medium and then the first scattering medium, forms one or more second bright speckles 932 on the first detector; or one or more third spots 934 of the electromagnetic radiation representing the "zeros" at each of the one or more second locations, so that the electromagnetic radiation, transmitted from the one or more third spots at the second locations and scattered by and through the second scattering medium and then the first scattering medium, forms one or more second dark speckles 936 on the first detector.

Block 1204 represent connecting a computer to the second detector so that the computer constructs the data stream by associating the one or more dark speckles with the "zeros" and the one or more bright speckles with the "ones."

23. The system of any of the examples 1-22 manufactured using the method of example 22.

24. The system or method of any of the examples 1-23, wherein the speckle pattern comprises a one time pad used to encrypt the data steam for communication between the stations.

REFERENCES

The following references are incorporated by reference herein:

[1] C. E. Shannon; A Math. theory Commun. 623 (1948).
[2] Popoff, S. M. et al.; Phys. Rev. Lett. 104 (2010)
[3] H. Ruan*, J. Xu*, C. Yang; under review.
[4] Goodman; J. Roberts and Company Publishers (2007)

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A communication system, comprising:
a first source of electromagnetic radiation comprising a point source transmitter device;
a first detector;
a first scattering medium electromagnetically coupled to the first source and the first detector;
a second detector;
an intensity modulator;
a second scattering medium electromagnetically coupled to the second detector and the intensity modulator; wherein:
the first source forms a first spot of the electromagnetic radiation at the first scattering medium, so that the electromagnetic radiation, transmitted from the first spot and scattered through the first scattering medium and the second scattering medium, forms a first speckle pattern comprising one or more first bright speckles at one or more first locations and one or more first dark speckles at one or more second locations;
the second detector detects one or more of the speckles at one or more of the locations;
the intensity modulator receiving data comprising a data stream of one or more bits comprising one or more "ones" and one or more "zeros," forms at least one of:
one or more second spots of electromagnetic radiation representing the "ones" at each of one or more of the first locations, so that the electromagnetic radiation, transmitted from the one or more second spots and scattered through the second scattering medium and then the first scattering medium, forms one or more second bright speckles on the first detector; or
one or more third spots of the electromagnetic radiation representing the "zeros" at each of the one or more third locations, so that the electromagnetic radiation transmitted from the one or more third spots at the second locations through the second scattering medium and then the first scattering medium, forms one or more second dark speckles on the first detector; and
a computer comprising one or more processors implemented in hardware connected to the second detector and constructing the data stream by associating the one or more dark speckles with the "zeros" and the one or more bright speckles with the "ones."

2. The communication system of claim 1, wherein the first source of electromagnetic radiation comprises a laser or light emitting diode and a lens or mirror focusing the electromagnetic radiation so as to form the first spot.

3. The communication system of claim 1, wherein the first source of electromagnetic radiation comprises a second intensity modulator.

4. The communication system of claim 1, wherein the first spot, the one or more second spots, and the one or more third spots each comprise a point source of the electromagnetic radiation.

5. The communication system of claim 1, further comprising:
a first station at a first station location, the first station comprising the first source, the first detector, and the first scattering medium; and
a second station at a second station location, the second station comprising the intensity modulator comprising a spatial light modulator, the second detector, and the second scattering medium;
wherein the first station comprises a first transmitter comprising the first source and a first receiver comprising the first detector;
wherein the second station comprises a second transmitter comprising the intensity light modulator and the second receiver comprises the second detector.

6. The communication system of claim 5, wherein the first station and second station are separated by a line of sight and the electromagnetic radiation is transmitted between the first scattering medium and the second scattering medium along the line of sight.

7. The communication system of claim 5, wherein the first station and second station are separated by an optical fiber and the electromagnetic radiation is transmitted between the first scattering medium and the second scattering medium along the optical fiber.

8. The communication system of claim 1, wherein the scattering medium comprise glass.

9. The communication system of claim 1, wherein the computer arranges the zeros and the ones in the data stream according to the chronological order the second bright speckles and the second dark speckles are detected on the first detector.

10. The system of claim 1, further comprising one or more lenses, mirrors, or collimators focusing or collimating the electromagnetic radiation so as to form the first spot or image the second spots or the third spots on the second scattering medium.

11. The system of claim 1, further comprising a second shield or aperture at an input to the second scattering medium and a first shield at an input to the first scattering medium, the shields or apertures suppressing transmission of noisy electromagnetic radiation that does not comprise the electromagnetic radiation being used to transmit the data stream.

12. The system of claim 1, wherein the detectors comprise an array of pixels and the locations are the locations or address of the pixels on the array that receive the speckles.

13. A computer implemented method for communicating, comprising:
transmitting electromagnetic radiation from a first source of electromagnetic radiation coupled to a first detector and a first scattering medium;
forming a first spot of the electromagnetic radiation at the first scattering medium, so that the electromagnetic radiation, transmitted from the first spot and scattered through the first scattering medium and the second scattering medium, forms a first speckle pattern comprising one or more first bright speckles at one or more first locations and one or more first dark speckles at one or more second locations;
detecting, on a second detector, one or more of the speckles at one or more of the locations;
receiving, on an intensity modulator, data comprising a data stream of one or more bits comprising one or more "ones" and one or more "zeros," outputting, from the intensity modulator, at least one of:
one or more second spots of electromagnetic radiation representing the "ones" at each of one or more of the first locations, so that the electromagnetic radiation, transmitted from the one or more second spots and scattered through the second scattering medium and then the first scattering medium, forms one or more second bright speckles on the first detector; or
one or more third spots of the electromagnetic radiation representing the "zeros" at each of the one or more second locations, so that the electromagnetic radiation transmitted from the one or more third spots at the second locations through the second scattering medium and then the first scattering medium, forms one or more second dark speckles on the first detector; and constructing, using a computer comprising one or more processors implemented in hardware connected to the second detector, the data stream by associating the one or more first dark speckles with the "zeros" and the one or more first bright speckles with the "ones."

14. A computer implemented system, comprising:

a computer comprising one or more processors implemented in hardware; one or more memories; and one or more programs stored in the one or more memories, wherein the one or more programs executed by the one or more processors performs a method, comprising:

constructing a data stream by associating each of one or more dark speckles with a "zero" and each of one or more bright speckles with a "one," the dark speckles and the bright speckles obtained by a process comprising:

transmitting electromagnetic radiation from a first source of electromagnetic radiation coupled to a first detector and a first scattering medium;

forming a first spot of the electromagnetic radiation at the first scattering medium, so that the electromagnetic radiation, transmitted from the first spot and scattered through the first scattering medium and a second scattering medium, forms a first speckle pattern comprising the bright speckles comprising one or more first bright speckles at one or more first locations and the dark speckles comprising one or more first dark speckles at one or more second locations;

detecting, on a second detector, one or more of the speckles at one or more of the locations;

receiving, on an intensity modulator, data comprising a data stream of one or more bits comprising the one or more "ones" and the one or more "zeros," outputting, from the intensity modulator, at least one of:

one or more second spots of electromagnetic radiation representing the "ones" at each of one or more of the first locations, so that the electromagnetic radiation, transmitted from the one or more second spots and scattered through the second scattering medium and then the first scattering medium, forms the bright speckles comprising one or more second bright speckles on the first detector; or one or more third spots of the electromagnetic radiation representing the "zeros" at each of the one or more second locations, so that the electromagnetic radiation transmitted from the one or more third spots at the second locations through the second scattering medium and then the first scattering medium, forms the dark speckles comprising one or more second dark speckles on the first detector.

15. The system of claim 14, wherein the computer constructs a message comprising the data stream, wherein the message is transmitted from a second station in a communications system comprising:

a first station at a first station location, the first station comprising the first source, the first detector, and the first scattering medium; and the second station at a second station location, the second station comprising the intensity modulator comprising a spatial light modulator, the second detector, and the second scattering medium;

wherein the first station comprises a first transmitter comprising the first source and a first receiver comprising the first detector; and wherein the second station comprises a second transmitter comprising the spatial light modulator and the second receiver comprises the second detector.

16. The system of claim 15, wherein the first station and second station are separated by a line of sight and the electromagnetic radiation is transmitted between the first scattering medium and the second scattering medium along the line of sight.

17. The system of claim 15, wherein the first station and second station are separated by an optical fiber and the electromagnetic radiation is transmitted between the first scattering medium and the second scattering medium along the optical fiber.

18. The system of claim 14, wherein the scattering medium comprise glass.

19. The system of claim 14, wherein the computer arranges the zeros and the ones in the data stream according to a chronological order the second bright speckles and the second dark speckles are detected on the detector.

20. The communication system of claim 14, wherein the first source of electromagnetic radiation comprises a second intensity modulator; and the first spot, the one or more second spots, and the one or more third spots each comprise a point source of the electromagnetic radiation.

* * * * *